(12) United States Patent
Castellani (10) Patent No.: US 9,801,494 B2
(45) Date of Patent: Oct. 31, 2017

(54) CAPSULE ADAPTER AND SYSTEM USING SAID CAPSULE ADAPTER

(71) Applicant: KONINKLIJKE PHILIPS N.V., Eindhoven (NL)

(72) Inventor: Andrea Castellani, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 365 days.

(21) Appl. No.: 14/391,741

(22) PCT Filed: Apr. 11, 2013

(86) PCT No.: PCT/IB2013/052873
§ 371 (c)(1),
(2) Date: Oct. 10, 2014

(87) PCT Pub. No.: WO2013/153526
PCT Pub. Date: Oct. 17, 2013

(65) Prior Publication Data
US 2015/0059588 A1 Mar. 5, 2015

Related U.S. Application Data

(60) Provisional application No. 61/622,563, filed on Apr. 11, 2012.

(51) Int. Cl.
*A47J 31/40* (2006.01)
*A47J 31/06* (2006.01)

(52) U.S. Cl.
CPC ......... *A47J 31/407* (2013.01); *A47J 31/0647* (2013.01); *A47J 31/0668* (2013.01); *A47J 31/0673* (2013.01)

(58) Field of Classification Search
CPC ... A47J 31/407; A47J 31/0668; A47J 31/0647
USPC .................................. 99/295, 278
See application file for complete search history.

(56) References Cited

U.S. PATENT DOCUMENTS

| | | | | |
|---|---|---|---|---|
| 2,464,722 A * | 3/1949 | Sacker | .................. | A47J 31/043 99/292 |
| 5,649,472 A * | 7/1997 | Fond | .................... | A47J 31/0673 426/433 |
| 6,021,705 A * | 2/2000 | Dijs | .................... | A47J 31/0678 99/295 |
| 6,026,732 A * | 2/2000 | Kollep | ................ | A47J 31/0668 99/295 |

(Continued)

FOREIGN PATENT DOCUMENTS

| | | |
|---|---|---|
| EP | 2320141 A1 | 5/2011 |
| EP | 2401945 A1 | 1/2012 |

(Continued)

*Primary Examiner* — Sean Michalski (57) ABSTRACT

A capsule adapter (1) is described, for use in a beverage producing machine. The capsule adapter comprises: a capsule receptacle (3) for housing a capsule (C) and having an apertured bottom wall (3B); a first piercer (19) arranged in the capsule receptacle (3); a cover (5) for closing the capsule receptacle (3), the cover having at least one water-inlet port (37); a second piercer (27) arranged on the cover (5). The capsule adapter is configured for being introduced in a brewing chamber of a beverage producing machine, with a capsule housed therein.

22 Claims, 3 Drawing Sheets

(56) References Cited

U.S. PATENT DOCUMENTS

| | | | |
|---|---|---|---|
| 6,645,537 B2 * | 11/2003 | Sweeney | B65D 85/8043 206/222 |
| 6,655,260 B2 | 12/2003 | Lazaris | |
| 7,993,691 B2 * | 8/2011 | Yoakim | B65D 85/8043 426/112 |
| 8,033,211 B2 | 10/2011 | Halliday | |
| 8,087,347 B2 | 1/2012 | Halliday | |
| 8,304,006 B2 * | 11/2012 | Yoakim | A47J 31/0678 426/112 |
| 8,846,120 B2 * | 9/2014 | Wong | A47J 31/3695 426/77 |
| 2002/0023543 A1 * | 2/2002 | Schmed | A47J 31/3623 99/295 |
| 2002/0048621 A1 * | 4/2002 | Boyd | A47J 31/3623 426/77 |
| 2003/0056661 A1 * | 3/2003 | Hu | A47J 31/0668 99/495 |
| 2003/0222089 A1 * | 12/2003 | Hale | B65D 85/8043 220/574 |
| 2005/0150391 A1 * | 7/2005 | Schifferle | A47J 31/0673 99/295 |
| 2005/0223904 A1 * | 10/2005 | Laigneau | A47J 31/3695 99/295 |
| 2006/0107841 A1 * | 5/2006 | Schifferle | A47J 31/0668 99/279 |
| 2006/0225575 A1 | 10/2006 | Denisart | |
| 2007/0104837 A1 * | 5/2007 | Yoakim | A47J 31/0668 426/77 |
| 2008/0245236 A1 | 10/2008 | Ternite | |
| 2009/0126577 A1 | 5/2009 | Ternite | |
| 2010/0107889 A1 * | 5/2010 | Denisart | A47J 31/3695 99/295 |
| 2010/0186599 A1 * | 7/2010 | Yoakim | A47J 31/22 99/295 |
| 2010/0303964 A1 * | 12/2010 | Beaulieu | B65D 85/8043 426/77 |
| 2011/0274802 A1 | 11/2011 | Rivera | |
| 2013/0118360 A1 * | 5/2013 | Dogan | A47J 31/0642 99/295 |
| 2013/0125762 A1 * | 5/2013 | Dogan | B65D 85/8043 99/295 |
| 2013/0139699 A1 * | 6/2013 | Rivera | B65D 85/8043 99/295 |
| 2013/0263423 A1 * | 10/2013 | Clark | A47J 31/407 29/428 |
| 2013/0340626 A1 * | 12/2013 | Oh | B65D 85/8043 99/295 |
| 2014/0130678 A1 * | 5/2014 | Frydman | A47J 31/407 99/295 |
| 2015/0027318 A1 * | 1/2015 | Dogan | A47J 31/407 99/295 |
| 2015/0157164 A1 * | 6/2015 | Digiuni | A47J 31/0673 99/295 |
| 2015/0272379 A1 * | 10/2015 | Perentes | A47J 31/0673 426/425 |
| 2015/0335197 A1 * | 11/2015 | Moon | A47J 31/3633 99/295 |
| 2015/0374165 A1 * | 12/2015 | Rivera | A47J 31/0678 99/300 |
| 2016/0137402 A1 * | 5/2016 | Talon | B65D 85/8043 99/295 |
| 2016/0174759 A1 * | 6/2016 | Cavanagh | A47J 31/60 99/295 |
| 2016/0192807 A1 * | 7/2016 | Ait Bouziad | A47J 31/0668 99/323 |

FOREIGN PATENT DOCUMENTS

| | | |
|---|---|---|
| EP | 2409608 A1 | 1/2012 |
| WO | 2009149897 A1 | 12/2009 |
| WO | 2011076748 A1 | 6/2011 |
| WO | 2012000878 A2 | 1/2012 |
| WO | 2012001115 A1 | 1/2012 |

* cited by examiner

CAPSULE ADAPTER AND SYSTEM USING SAID CAPSULE ADAPTER

This application is the U.S. National Phase application under 35 U.S.C. §371 of International Application No. PCT/IB2013/052873, filed on Apr. 11, 2013, which claims the benefit of U.S. Provisional Application No. 61/622,563 filed on Apr. 11, 2012. These applications are hereby incorporated by reference herein.

TECHNICAL FIELD

The present disclosure refers to systems and devices for the production of beverages, such as coffee and coffee-based beverages, tea and the like. More specifically, the present disclosure refers to systems for the preparation of beverages using single-serving packages, i.e. single dose packages, such as capsules, cartridges or pods.

BACKGROUND ART

The use of single-serving or single-dose packages, such as capsules, cartridges or pods, for the preparation of hot beverages such as coffee and the like is becoming more and more popular. Use of capsules and other single-serving packages is extremely practical, since the ingredients for the preparation of the beverage remains contained in the capsule and can be easily removed by discharging the spent capsule from the machine, without the machine becoming soiled by residual products derived from the beverage infusion or preparation process.

Usually, a beverage preparing system is characterized by a beverage brewing unit configured for receiving one single kind of capsules only. The capsules are designed and manufactured based on the kind of beverages they are intended for. Disposable capsules are for example used for the preparation of filter coffee, wherein hot water at relatively low pressure is percolated through the capsule to extract the flavors from coffee powder sealingly contained in the capsule. Piercers are provided to pierce the top and the bottom walls of the capsule and allow hot brewing water to flow through the capsule. Devices and systems using filter capsules or cartridges of this kind are disclosed for example in U.S. Pat. No. 6,655,260.

Disposable capsules or cartridges are also used for the preparation of espresso coffee. This kind of beverage is brewed by flowing hot pressurized water through the coffee-powder containing capsules. The relatively high brewing pressure ranging usually between 10 and 15 bars, generates a layer of cream on top of the beverage, which characterizes the typical espresso coffee. Espresso-coffee cartridges or capsules are usually smaller than filter coffee capsules and require a differently shaped brewing chamber.

BRIEF DESCRIPTION OF THE INVENTION

A capsule adapter is provided, which enables the use of espresso coffee capsules in a beverage preparing machine configured for handling filter coffee capsules of larger dimensions, so that the same machine becomes capable of brewing different kinds of beverages depending upon what kind of capsules the user introduces in one and the same brewing chamber.

Reference will be made below to capsules and capsule adapters. The term "capsule" shall be understood as any single-dose package, preferably a sealed single-dose package, containing the ingredients for the preparation of a beverage by flowing brewing water there through. A beverage shall be understood as any substantially liquid edible product, such as but not limited to coffee or coffee-based beverages.

According to some embodiments a capsule adapter for use in a beverage producing machine or device is provided, said capsule adapter comprising a capsule receptacle having an apertured bottom wall. A first piercer arranged in the capsule receptacle; a cover for closing the capsule receptacle. The cover is provided with at least one water-inlet port and a second piercer is combined thereto, for example mounted or arranged thereon. "Apertured" means that the bottom wall of the capsule receptacle has one or more ports, apertures, holes or passages, allowing a beverage extracted from a capsule housed in the capsule adapter to flow out of the capsule adapter through the bottom all thereof. In some embodiments a single central aperture is provided in the bottom wall of the capsule receptacle.

The capsule adapter is dimensioned and configured such that it can be introduced in a brewing chamber of a brewing unit designed to house larger capsules, for example filter-coffee capsules. The capsule adapter will then be configured to receive e.g. espresso-capsules, so that the same beverage producing machine can produce filter coffee or espresso coffee using different capsules. The capsules can differ in dimension and content. They can also differ as far as the perforating system is concerned. For example the larger capsules can have a liquid-pervious top surface and/or a liquid-pervious bottom surface. In such case the brewing chamber will comprise only one perforator or no perforators at all. The capsule adapter includes a top perforator and a bottom perforator so that capsules used in combination with the capsule adapter will be properly perforated on both sides, even if used in a brewing machine which has only one perforating arrangement or no perforating arrangement at all.

If the brewing chamber of the brewing machine is provided with its own top and bottom perforators, the capsule adapter can be designed such as to perforate the capsule according to a different perforating sequence, allowing the use of capsules configured for a brewing mode different from the brewing mode, which the brewing chamber is designed for. For example the brewing chamber can be designed to perforate the capsules already upon closing the brewing chamber before water starts flowing there through. The perforators in the capsule adapter can be configured to perforate the bottom of the capsule only after a pre-infusion step has been performed, i.e. only after the capsule has been pressurized with hot, high-pressure water pumped by a pump through a water heater.

In some embodiments the capsule adapter comprises a reversible locking arrangement for reversibly locking said cover to said capsule receptacle. The locking arrangement makes use of the capsule adapter easier. The user can introduce a capsule in the capsule receptacle and close the capsule adapter by locking the cover on the capsule receptacle. The unit formed by the capsule and the closed capsule adapter can then easily be handled as a larger capsule to be introduced in the brewing unit.

Preferably, the cover of the capsule adapter comprises a sealing gasket co-acting with said capsule receptacle. In this way the capsule housed in the capsule adapter can be sealed around the capsule rim before being introduced in the brewing chamber of a beverage preparing device. Proper pressurization of the capsule is made thus possible, before aperturing the capsule bottom, e.g. by flexurally deforming a flat or concave bottom against a piercer or perforator arranged in the capsule receptacle.

According to some embodiments the capsule receptacle comprises an annular shoulder surrounding a capsule seat; and said annular sealing gasket is arranged for co-acting with said annular shoulder when said capsule adapter is in a closed condition.

To prevent damages to the capsule during closing of the capsule adapter, according to some embodiments the second piercer arranged in the cover of the capsule adapter is connected to the cover so that mutual movement between the perforator and the cover is possible. This movement can be a translation movement in the axial direction and/or a rotation movement around the axis of the capsule adapter. In both cases, as will become apparent from the detailed description of some embodiments, this movement prevents accidental damages to the capsule before the actual brewing cycle starts.

In some embodiments, the second piercer is resiliently biased in a rest position inside the cover. The second piercer is thus maintained at a distance from the capsule housed in the capsule adapter, once the cover has been locked on the capsule receptacle. The second piercer will be forced against the capsule by the water pressure upon starting of the brewing cycle. Damages to the capsule prior to the brewing cycle is thus effectively prevented.

In a different embodiment the second piercer is rotatingly connected to the cover, so that the second piercer is prevented from rotating with respect to the capsule receptacle while the cover and the capsule receptacle are rotated one with respect to the other to lock the cover to the capsule receptacle. Also in this way, damaging the capsule during closure of the capsule adapter is prevented. The piercer penetrates in the capsule top with an axial translation movement, i.e. with an insertion movement parallel to the axis of the capsule, without rotating with respect to the capsule, so that clean apertures are formed by piercing in the top wall of the capsule. In this embodiment, the capsule is pierced upon closure of the capsule adapter rather than upon start of the brewing cycle.

According to some embodiments, the first piercer comprises: a first piercing plate, provided with a first surface facing said bottom wall and a second surface facing the interior of said capsule receptacle; at least one central piercing projection extending from said second surface towards the interior of the capsule receptacle; and at least one through aperture fluidly connecting said first surface and said second surface of said first piercing plate.

The water inlet port can be variously located on the cover of the capsule adapter. In preferred embodiments, the water inlet port is centrally arranged in said cover. This renders the capsule adapter suitable for use in a brewing chamber having a centrally arranged water delivery duct. In some embodiments, the second piercer comprises: a respective piercing plate, provided with a first surface facing the water inlet port and a second surface facing the interior of said capsule receptacle, when said cover is connected to said capsule receptacle. Moreover, in preferred embodiments a plurality of piercing projections extend from said second surface. With this arrangement, the capsule is perforated according to a plurality of apertures, which improves the water distribution along the entire cross section of the capsule. Advantageously, a plurality of through apertures, fluidly connecting the first surface and the second surface of the piercing plate, can be provided. In this way, water entering centrally through the central water inlet port provided in the cover of the capsule adapter can be evenly distributed over the surface of the capsule, to obtain a uniform water flow inside the capsule. The through apertures can be provided through the piercing projections. This, however, is not essential. The through apertures can be offset with respect to the piercing projections.

According to a further development of the subject matter disclosed herein, the capsule adapter can comprise a recognition element. Preferably, the recognition element is a machine-detectable recognition element, i.e. an element which can be recognized by the beverage producing device or machine using the capsule adapter. The recognition element can be an optical, or a magnetic, or a capacitive recognition element, or a recognition element of any other nature, depending on the kind of detecting means, arrangement or apparatus provided on the beverage producing device or machine. The recognition element can also simply be a tag, projection, extension or appendix provided on the capsule adapter which can be detected by an optical sensor, by a micro-switch or by any other arrangement on the beverage producing device or machine. The recognition element can advantageously be used to automatically provide instruction to the device for setting one or more brewing parameters based on the presence or absence of the capsule adapter. For example, the presence of the capsule adapter, detected via said recognition element, can be used to set a higher brewing water pressure, so that brewing is performed at a pressure or at a flow rate different from those used when no capsule adapter is present in the device.

Further embodiments and advantageous features of the subject matter disclosed herein are set forth in the appended claims, which form an integral part of the present description.

According to a further aspect, the invention also refers to a system for producing beverages by means of single dose capsules containing at least one ingredient, said system comprising a beverage-producing machine or device with a brewing chamber and a capsule adapter as described above, wherein the capsule adapter is configured to be housed in said brewing chamber.

More specifically, a system for producing beverages by means of single serve capsules containing at least one ingredient is provided, comprising: a beverage-producing machine with a brewing chamber: and a capsule adapter said capsule adapter being designed to be housed in said brewing chamber; wherein the capsule adapter comprises: a capsule receptacle for housing a capsule and having an apertured bottom wall; a first piercer arranged in said capsule receptacle; a cover for closing said capsule receptacle, said cover having at least one water-inlet port; a second piercer on the cover. The system is suitable for using capsules of a first type, designed to be introduced directly in the brewing chamber, and capsules of a second type, designed to be arranged in the capsule adapter and the capsule adapter introduced in the brewing chamber.

In a manner known per se, the beverage producing machine comprises a water pump for delivering water to the brewing chamber. Advantageously the beverage producing machine can comprise a setting device, for setting at least one water-flow parameter according to whether a capsule adapter is present in the brewing chamber. According to preferred embodiments the beverage-producing machine comprises a sensor for detecting the presence of said capsule adaptor in said brewing chamber. In other embodiments, the presence of the capsule adapter can be communicated to the machine by the user via a user-interface or the like. If a sensor is present, the latter is designed and arranged to detect a recognition element on said capsule adapter, when said capsule adapter is introduced in said brewing chamber. The sensor is connected to a control unit. The latter can advantageously be programmed to set a brewing water pressure value depending upon the presence or absence of the capsule adapter.

In some embodiments, at least one capsule piercing member is arranged in said brewing chamber. The capsule piercing member can be provided to pierce the top or the bottom of the capsule. Two piercing members, one for the top and one for the bottom of the capsule can be provided in some embodiments. Preferably, the brewing chamber, the at least one capsule piercing member arranged in the brewing chamber and the capsule adapter are designed so that when said brewing chamber is closed with said capsule adapter therein, said at least one capsule piercing member arranged in the brewing chamber does not pierce the capsule adapter. In this manner the capsule adapter can be used more than once, without being damaged or altered by the piercing member in the brewing chamber. In other, less advantageous embodiments, the capsule adapter could be disposable. In such case the piercing member in the brewing chamber could even pierce the capsule adapter.

For instance, the brewing chamber, the at least one capsule piercing member arranged in the brewing chamber and the capsule adapter are designed so that when said brewing chamber is closed with said capsule adapter therein, said at least one capsule piercing member arranged in the brewing chamber is positioned in or in front of a port provided in said capsule adapter, for example in the cover of the capsule adapter, or the bottom wall of the capsule receptacle of the capsule adapter. This prevents the capsule adapter from being pierced by the piercing member provided in the brewing chamber. In some embodiments two piercing members are provided in the brewing chamber, for piercing both the top and the bottom of a capsule. In such case, preferably both piercing members are arranged and designed such as not to perforate or damage the capsule adapter, e.g. they can be designed to be arranged in or in front of respective ports or apertures in the cover and in the capsule receptacle of the capsule adapter.

The capsule piercing member arranged in the brewing chamber can be positioned to deliver water in the water inlet port of the cover of the capsule adapter. In other embodiments the capsule piercing member arranged in the brewing chamber can be designed and arranged to collect a beverage dispensed through a port in the capsule adapter, e.g. in the bottom wall of the capsule receptacle. In some embodiments a first capsule piercing member and a second capsule piercing member can be used to deliver water in the capsule adapter and collect a beverage from the capsule adapter, respectively.

The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

The following description refers to an application of the invention to a coffee machine, but it should be understood that the invention can be embodied in other different kinds of beverage producing machines, or also in different kinds of apparatus, machines or devices for handling edible products and producing beverages.

Figure 1:
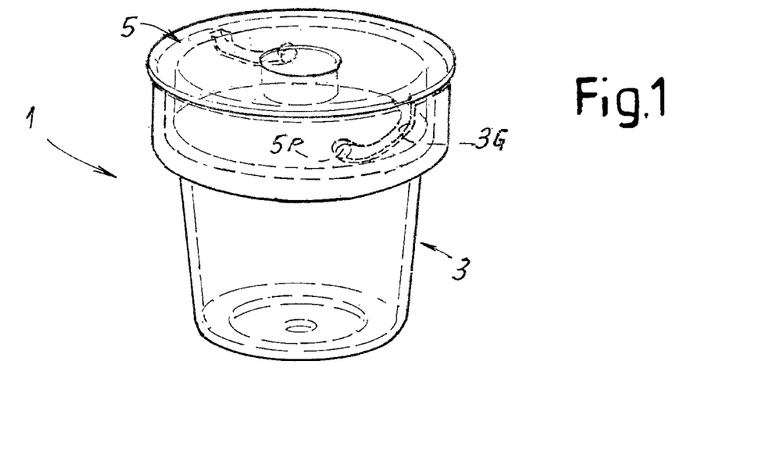
FIG. 1 illustrates a perspective view of a capsule adapter according to the present disclosure.
Figure 2:
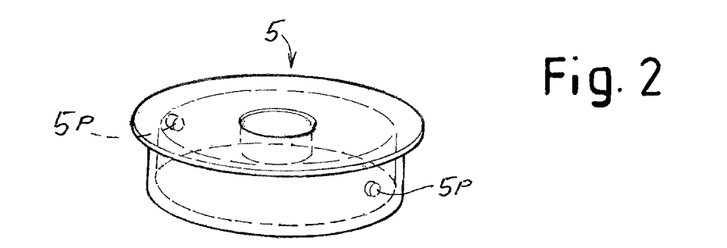
FIG. 2 illustrates a perspective view of the cover of the adapter shown in FIG. 1.
Figure 3:
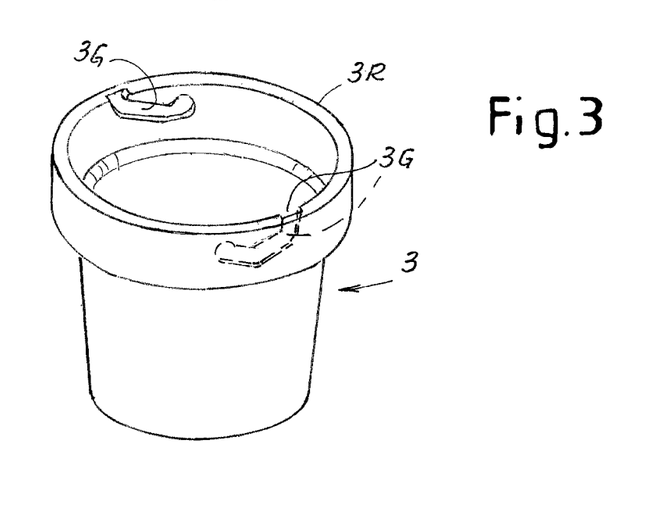
FIG. 3 illustrates a perspective view of the upper portion of the capsule receptacle of the capsule adapter shown in FIG. 1.

A first embodiment of an adapter according to the subject matter disclosed herein is illustrated in FIGS. 1 to 4. The capsule adapter is labeled 1 and comprises a capsule receptacle 3 and a plug or cover 5, which can be reversibly connected to one another. The cover 5 can sealingly close the capsule receptacle 3 when a disposable capsule is placed therein. FIG. 1 illustrates the capsule adapter in a closed condition, while FIG. 2 illustrates the cover 5 in isolation. FIG. 3 illustrates the top portion of the capsule adapter 3 in perspective view.

In the embodiment of FIGS. 1 to 3 the capsule receptacle 3 and the cover 5 can be connected reversibly to one another by means of a reversible locking arrangement similar by a bayonet closure. According to this embodiment the cover 5 is provided with two oppositely arranged pins 5P radially projecting from the cover 5. The pins 5P are designed for engagement in two guides or channels 3G provided along the upper rim 3R of the capsule receptacle 3. The guides 3G open along the rim 3R and develop downwardly along the inner surface of the capsule receptacle 3 so that the pins 5P can slidingly engage along the two guides 3G reversibly engaging the cover 5 to the capsule receptacle 3.

Figure 4:
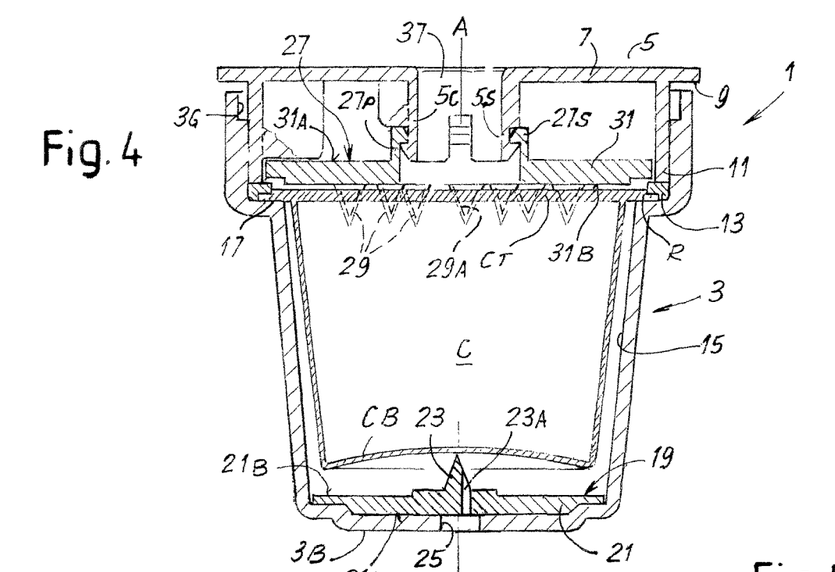
FIG. 4 illustrates a longitudinal section of a first embodiment of a capsule adapter with a capsule arranged therein.

FIG. 4 illustrates a longitudinal section of the capsule adapter 1 along a vertical plane containing the axis A-A of the capsule adapter 1. In this embodiment the cover 5 is provided with a substantially planar top wall 7 surrounded by a rim 9, from the lower surface whereof (i.e. the surface facing the capsule receptacle 3, when the capsule adapter is in the closed position) a substantially cylindrical collar 11 projects. In the embodiment shown in FIG. 4 the collar 11 is provided with an annular sealing gasket 13.

The capsule receptacle 3 forms a capsule seat 15 designed to house a disposable capsule C, for example a capsule for the preparation of espresso coffee.

The capsule seat 15 is surrounded by an annular shoulder 17. When the capsule C is introduced in the capsule adapter 1, a capsule rim or capsule flange R will come to rest on the annular shoulder 17 and when the cover 5 is reversibly attached to the capsule receptacle 3, the sealing gasket 13 will co-act with the annular shoulder 17 and the capsule rim R to provide a seal around the capsule rim R.

Near the bottom of the capsule seat 15 a first piercer 19 is arranged. In this embodiment the first piercer 19 comprises a first piercing plate 21 with a first surface 21A facing a bottom wall 3B of the capsule receptacle 3, and a second surface 21B facing the interior of the capsule seat 15. In the exemplary embodiment shown in FIG. 4, a single piercing projection 23 is centrally arranged on the piercing plate 21 and projects towards the interior of the capsule seat 15. The piercing projection 23 can be for example conically shaped and forms a beverage outlet, through which beverage extracted from the capsule C flows across the piercing plate 21 towards a port 25 provided in the bottom wall 3B of the capsule receptacle 3.

In the illustrated embodiment an outlet passage 23A for the beverage is formed as a channel inside the body of the piercing projection 23 and through the thickness of the piercing plate 21. In other embodiments, not shown, the outlet passage for the beverage can be shaped in a different manner, for example as an outer channel extending along the conical surface of the piercing projection 23 and in fluid communication with a surface indentation on the surface 21B of the piercing plate 21, which is in turn in fluid communication with one or more apertures across the piercing plate 21.

Preferably, a second piercer 27 is combined to the cover 5 of the capsule adapter 1. In the exemplary embodiment shown in FIG. 4, the second piercer 27 is housed in a substantially cylindrical volume surrounded by the collar 11.

In advantageous embodiments the second piercer 27 is provided with a plurality of piercing projections 29, extending from a surface 31B of a second piercing plate 31, the opposite surface 31A whereof faces a wall 7 of the cover 5. In the embodiment illustrated in FIG. 4, each piercing projection 29 is provided with a flow passage 29A, through which brewing water can flow into the capsule C. Water can flow through the port 37 in the space between the surface 31B of the piercing plate 31 and the top wall CT of the capsule C. From there the water can flow through the apertures generated in the top wall CT of the capsule by the piercing projections 29.

The second piercer 27 is rotatingly engaged to the cover 5. "Rotatingly engaged" means that the cover 5 and the second piercer 27 can rotate, i.e. swivel, one with respect to the other around the axis A-A of the capsule adapter 1. In the embodiment shown in FIG. 4 this is made possible by a snap engagement between the second piercer 27 and the cover 5 of the capsule adapter 1. As shown by way of example in FIG. 4, the second piercer 27 is provided with a substantially cylindrical projection 27B provided at the distal end thereof with an annular shoulder 27S engaging in an annular seat 5S formed on the outer surface of a cylindrical projection 5C extending from the surface of the cover 5 facing the interior of the capsule adapter 1, when the latter is in the closed position as shown in FIG. 4. The engagement between the second piercer 27 and the cover 5 is such that the two members can rotate freely one with respect to the other for the purposes which will become clearer from the following description.

The cylindrical projection 5C defines a water inlet port 37 in fluid communication with a central aperture 27C, which extends across the full thickness of the piercing plate 31 of the second piercer 27. In this manner, water entering the water inlet port 37 can enter the space between the surface 31B of the piercing plate 31 and the top wall CT of a capsule C sealingly retained in the capsule adapter 1.

The outer shape and dimensions of the capsule adapter 1 are such that the capsule adapter 1 can be housed in a brewing chamber of an existing beverage preparing machine designed for handling larger capsules, for example for the production of filter coffee.

Figure 5:
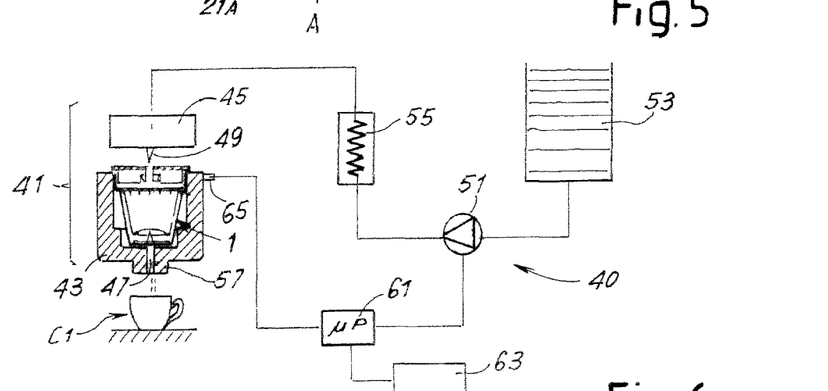
FIG. 5 illustrates a block diagram of the main components of a beverage-preparing machine using a capsule and a capsule adapter.

FIG. 5 schematically shows a brewing chamber of this kind wherein a capsule adapter 1 has been introduced. FIG. 5 illustrates some of the main components of the beverage producing machine, labeled 40 as a whole. 41 indicates the brewing chamber. In the embodiment shown the brewing chamber has a first brewing chamber portion 43 and a second brewing chamber portion 45, which are movable one with respect to the other for opening and closing the brewing chamber.

In FIG. 5 a capsule adapter 1 is housed in the brewing chamber 41, which is in the closed position. The brewing chamber 41 comprises a bottom capsule piercing member 47 and a top capsule piercing member 49. These capsule piercing members are designed to pierce the top and the bottom of a larger capsule, for example a filter coffee capsule, which can be used in combination with a brewing chamber 41 without the capsule adapter 1. The dimension of the capsule adapter 1 is such that, when the capsule adapter 1 is housed in the brewing chamber 41 and the latter is closed, the bottom capsule piercing member 47 and the top capsule piercing member 49 will not perforate or damage the capsule adapter 1. Rather, as can be seen in FIG. 5, the top capsule piercing member 49 will be positioned above or partly inside the water inlet port 37 formed in the cover 5 of the capsule adapter 1. The lower capsule piercing member 47 will be located under or partially inside the port 25.

The beverage producing machine 40 further comprises a pump 51. The pump 51 which pumps water from a water tank 53 through a water heater 55. Hot water from the water heater 55 is fed into the brewing chamber 41 and through the capsule C retained in the capsule adapter 1.

Figure 6:
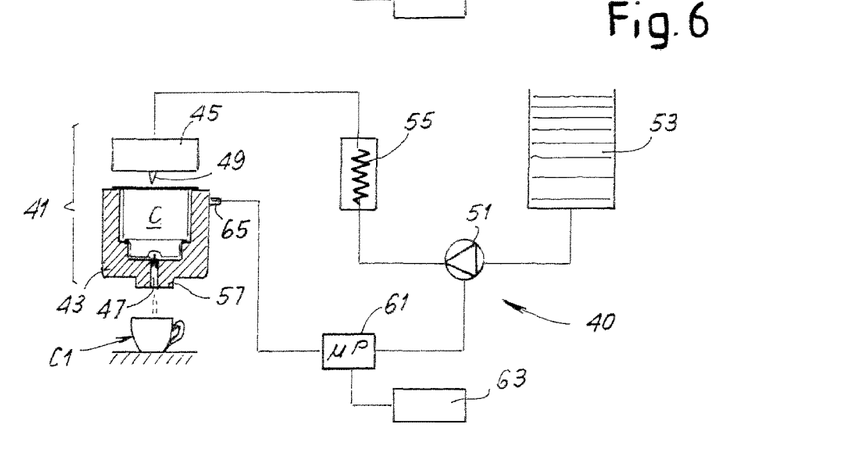
FIG. 6 illustrates the block diagram of FIG. 5 in combination with a filter coffee capsule.

The user can introduce in the brewing chamber 41 selectively a capsule adapter 1, wherein a capsule C has been placed, or a larger capsule, for example a filter coffee capsule C1 as schematically shown in FIG. 6.

When a capsule C is used in combination with a capsule adapter 1, the user introduces the capsule C in the capsule receptacle 3 and closes the capsule adapter 1 by connecting the cover 5 to the capsule receptacle 3. The rotating connection between the second perforator 27 and the cover 5 is such that while rotating the cover 5 with respect to the capsule receptacle 3 to close the capsule adapter 1, the projections 21 penetrate through the top CT of the capsule C perforating the latter, without tearing the material forming the top wall of the capsule. The capsule remains stationary in the capsule receptacle 3 while the cover 5 rotates around the axis A-A and moves axially towards the capsule receptacle 3, due to the shape of the guides 3G. Since the second perforator 27 can rotate around axis A-A with respect to the cover 5, once the projections 21 have started penetrating the top of the capsule C, further rotation of the projections 21 with respect to the capsule C is prevented. The projections 21 will continue penetrating through the top wall CT of the capsule C with an axial movement, without tangentially tearing the capsule while the cover 5 will reach its end position with respect to the capsule receptacle 3.

At the end of the closing movement, the top wall CT of the capsule C will therefore be perforated neatly by the projections 21 which put into communication the outer surface and the inner surface of the top wall CT of the capsule C.

In some embodiments the capsule C can be shaped with a bottom wall CB which is curved and has an outer concavity, as shown in FIG. 4. The bottom wall CB of the capsule C will be perforated only upon starting of the brewing cycle. Indeed, once the capsule adapter 1 has been closed, the bottom wall CB will not be apertured by the perforating projection 23 which is too short to puncture or perforate the bottom wall. Upon closing the brewing chamber with the capsule adapter 1 and the capsule C housed therein, the pressure inside the capsule C will build up due to the pumping of hot water by pump 51 into the brewing chamber 41 and into the capsule C through the apertures formed by the projections 29. The water pressure will deflect the bottom wall CB of the capsule C against the perforating projection 23 until the latter perforates the bottom wall CB causing the extracted beverage to flow out of the capsule through the passage 23A and the outlet port 25. Therefrom the beverage will flow through the pervious bottom piercing member 47 and will be finally dispensed through a beverage dispensing spout 57 into cup or other container C1 arranged under the spout 57. This mode of operation is advantageous since a pre-infusion step is made possible before starting actual beverage dispensing.

Other embodiments provide for a different perforating system, wherein for example the capsule C is perforated already upon closing of the capsule adapter 1.

As noted above, the user can introduce in a brewing chamber 41 also a capsule of a different type, for example for producing filter coffee, as schematically shown in FIG. 6. In some embodiments, the pump 51 can be manually or automatically controlled to deliver the brewing water at the proper rate and pressure through the brewing chamber 41 depending on whether the capsule adapter 1 and the capsule C or else a capsule C1 alone is used. In the brewing mode disclosed above with reference to FIG. 5, for example, the pump 51 will deliver water at a high pressure, typically above 10 bars, for example between 12 and 16 bars in the brewing chamber 41. In the brewing mode according to FIG. 6, vice versa, the pump 51 will deliver a higher water rate at a lower pressure, for example around 1-4 bars. The above values are given by way of example only and should not be construed as limiting the present disclosure.

The pump 51 can be controlled by a central control unit 61 provided in the beverage producing machine 40. The brewing parameters required can be selected by the user through a user's interface 63. In other possible embodiments, the selection of the water flow parameters can be automatic, for example by means of a sensor schematically shown in 65, combined with the brewing chamber 41. The sensor 65 could for example be designed to detect a recognition element provided on the capsule adapter 1. Such recognition element could be the very same material whereof the one or the other of the capsule adapter components 3, 5, 27, 19 are made. For example, the first piercer 19 and/or the second piercer 27 can be made of metal and can be detected as a recognition element by capacity sensors 65. In other embodiments the recognition element can be for example embedded in the capsule receptacle 3, or else in the cover 5. In yet further embodiments the recognition element can be applied on the surface of the cover 5 and/or of the capsules receptacle 3 and detected by an optical sensor.

Figure 7:
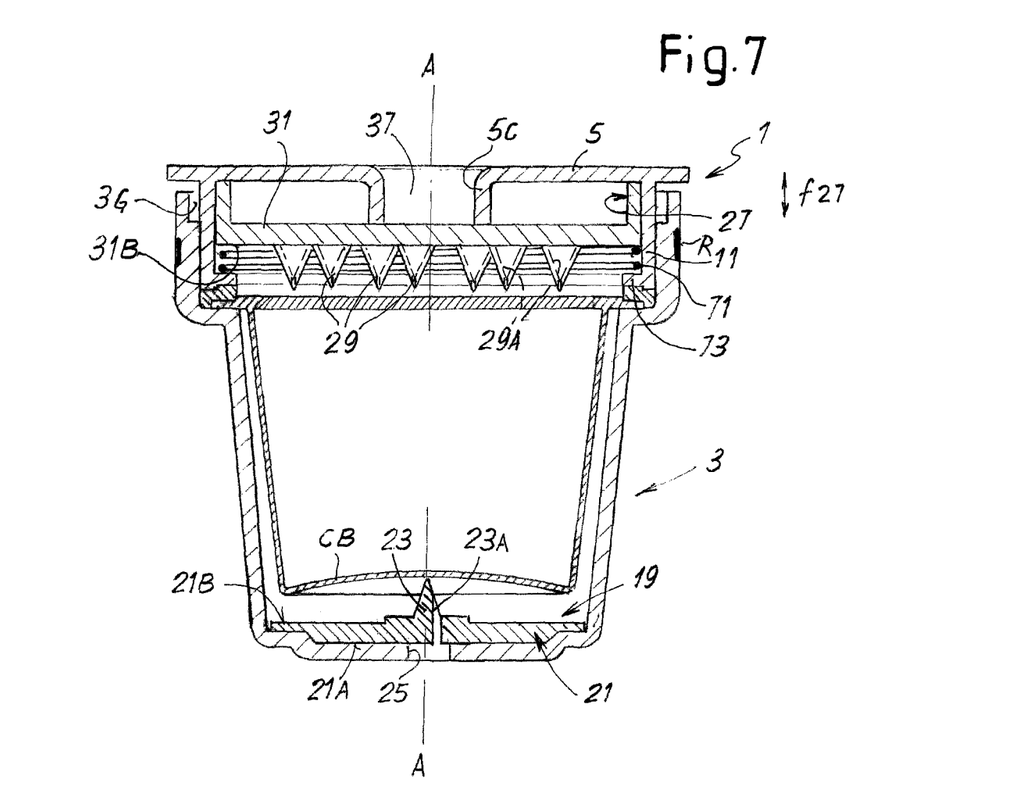
FIG. 7 illustrates a longitudinal section of a further embodiment of the capsule adapter with a capsule arranged therein.

FIG. 7 illustrates a longitudinal section along a plane containing the axis A-A of a capsule adapter 1 according to a further embodiment of the subject matter disclosed herein. The same reference numbers are used to designate the same or equivalent parts or components in FIG. 4. Those parts and their functions will not be described again.

The main difference between the embodiment of FIG. 4 and the embodiment of FIG. 7 concerns the way the second piercer 27 is combined with the cover 5. In the embodiment of FIG. 7 the second piercer 27 is movably housed in the substantially cylindrically space surrounded by the collar 11 of the cover 5 for axially movement according to the double-arrow f27. The second piercer 27 is biased in a rest position, shown in FIG. 7, by a resilient member 71. In the rest position the second piercer 37 is retracted in the hollow space inside the collar 11. In the embodiment illustrated in FIG. 7, the resilient member 71 is a helical compression spring retained between the surface 31B of the second piercing plate 31 and an annular abutment 73, radially inwardly projecting from the collar 11. The length of the piercing projections 29 and the height of the collar 11 (i.e. the axial dimension thereof) are selected such that in the closed resting position shown in FIG. 7 the perforating projections 29 will not perforate the top wall CT of the capsule C retained in the capsule receptacle 3.

When the capsule adapter 1 is introduced in the brewing chamber 41 and pressurized water is delivered through the water inlet port 37, the water pressure will overcome the biasing force of the spring 71 pressing the second piercer 27 against the capsule C until the piercing projections 29 pierce the top wall CT of the capsule C and penetrate there through. This is made possible by the pressure difference established between the two surfaces 31B and 31A of the piercing plate 31, due to the pressure drop across passages 29A through the piercing projections 29 or across passages provided through the piercing plate 31 between the piercing projections 29, and not shown. The top wall CT of the capsule will thus be apertured and water can start flowing in the capsule C.

With this arrangement the cover 5 of the capsule adapter 1 can be engaged to the capsule receptacle 3 without any contact between the piercing projection 29 and the capsule C. The latter will not be damaged by the closing movement between the capsule receptacle 3 and the cover 5 and will only be perforated upon pressurization of the capsule adapter.

In FIG. 7 a capsule recognition element R is also schematically shown. The capsule recognition element can be e.g. a optically readable printed strip, or a metal insert which can be detected by a capacity sensor, or any other element. In some embodiments the capsule recognition element can surround the entire capsule receptacle 3, so that it can be detected by a sensor arranged in the beverage producing machine, irrespective of the angular position taken by the capsule adapter in the brewing chamber. The recognition element allows the machine to automatically recognize the presence of the capsule adapter in the brewing chamber.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A capsule adapter for use in a beverage producing machine, said capsule adapter comprising:
    a capsule receptacle for housing a capsule and having an apertured bottom wall;
    a first piercer arranged in said capsule receptacle;
    a cover for closing said capsule receptacle, said cover having at least one water-inlet port;
    said capsule adapter being configured for being introduced in a brewing chamber with a capsule housed therein;
    wherein a second piercer is arranged on said cover and is movably connected thereto, and
    wherein said capsule receptacle comprises an annular shoulder surrounding a capsule seat; and an annular sealing gasket is arranged for co-acting with said annular shoulder when said capsule adapter is in a closed condition.

2. Capsule adapter according to claim 1, comprising a reversible locking arrangement for reversibly locking said cover to said capsule receptacle, said cover comprising two oppositely arranged pins radially projecting from said cover, wherein said pins are adapted for engagement in respective channel guides provided along an upper rim of said capsule receptacle, and wherein said pins slidingly engage along said respective channel guides thereby reversibly engaging said cover to the capsule receptacle.

3. Capsule adapter according to claim 1, wherein said cover comprises a sealing gasket co-acting with said capsule receptacle.

4. Capsule adapter according to claim 1, wherein said second piercer is resiliently biased in a closed rest position by a resilient member in said cover, wherein in said closed rest position said second piercer is retracted in a hollow space inside of a hollow space inside a collar.

5. Capsule adapter according to claim 4, wherein the resilient member is a helical compression spring retained between a first surface said second piercer and an annular abutment radially inwardly projecting from said collar.

6. Capsule adapter according to claim 5, wherein the length of the piercing projections and the height of the collar are selected such that in the closed resting position, the perforating projections will not perforate the top wall of the capsule retained in the capsule receptacle.

7. Capsule adapter according to claim 1, wherein said second piercer is rotatingly connected to said cover, so that said second piercer is prevented from rotating with respect to the capsule receptacle while the cover and said capsule receptacle rotate one with respect to the other to engage the cover to the capsule receptacle.

8. Capsule adapter according to claim 1, wherein said first piercer comprises: a first piercing plate, provided with a first surface facing the bottom wall of said capsule receptacle and a second surface facing the interior of said capsule receptacle; at least one central piercing projection extending from said second surface towards the interior of the capsule receptacle; and at least one through aperture fluidly connecting said first surface and said second surface of said first piercing plate.

9. Capsule adapter according to claim 1, wherein said water inlet port is centrally arranged in said cover and wherein said second piercer comprises: a second piercing plate, provided with a first surface facing said cover and a second surface facing the interior of said capsule receptacle, when said cover is connected to said capsule receptacle; a plurality of piercing projections extending from said second surface.

10. Capsule adapter according to claim 9, wherein said second piercer further comprises a plurality of through apertures fluidly connecting said first surface and said second surface of said second piercing plate.

11. Capsule adapter according to claim 1, comprising a recognition element.

12. A system for producing beverages by means of single serve capsules containing at least one ingredient, said system comprising:
    a beverage-producing machine with a brewing chamber: and a capsule adapter said capsule adapter being designed to be housed in said brewing chamber;
    wherein said capsule adapter comprises:
        a capsule receptacle for housing a capsule and having an apertured bottom wall;
        a first piercer arranged in said capsule receptacle;
        a cover for closing said capsule receptacle, said cover having at least one water-inlet port;
        wherein a second piercer arranged on said cover and is movably connected thereto, and
        wherein said capsule receptacle comprises an annular shoulder surrounding a capsule seat; and an annular sealing gasket is arranged for co-acting with said annular shoulder when said capsule adapter is in a closed condition.

13. System according to claim 12, wherein said machine comprises a sensor for detecting the presence of said capsule adaptor in said brewing chamber, and wherein said machine comprises a water pump and a setting device, for setting at least one water-flow parameter according to whether said sensor detects the presence of said capsule adapter in the brewing chamber.

14. System according to claim 12, wherein said sensor is designed and arranged to detect a recognition element on said capsule adapter, when said capsule adapter is introduced in said brewing chamber.

15. System according to claim 12, wherein said machine comprises a control unit connected to said sensor said control unit being arranged for modifying at least one water flow parameter based on a signal from said sensor.

16. System according to claim 12, wherein at least one capsule piercing member is arranged in said brewing chamber.

17. System according to claim 16, wherein said brewing chamber, said at least one capsule piercing member arranged in the brewing chamber and said capsule adapter are designed so that when said brewing chamber is closed with said capsule adapter therein, said at least one capsule piercing member arranged in the brewing chamber does not pierce the capsule adapter.

18. System according to claim 16, wherein said brewing chamber, said at least one capsule piercing member arranged in the brewing chamber and said capsule adapter are designed so that when said brewing chamber is closed with said capsule adapter therein, said at least one capsule piercing member arranged in the brewing chamber is positioned in or in front of a port provided in said capsule adapter, preventing said piercing member from damaging the capsule adapter.

19. System according to claim 16, wherein said at least one capsule piercing member arranged in the brewing chamber and said capsule adapter are designed such that said at least one capsule piercing member arranged in the brewing chamber is positioned to deliver water in said water inlet port of said cover of the capsule adapter.

20. System according to claim 16, wherein a second capsule piercing member is arranged in said brewing chamber, and wherein said brewing chamber, said second capsule piercing member arranged in the brewing chamber and said capsule adapter are designed so that when said brewing chamber is closed with said capsule adapter therein, said second capsule piercing member arranged in the brewing chamber does not pierce the capsule adapter.

21. System according to claim 16, wherein a second capsule piercing member is arranged in said brewing chamber, and wherein said brewing chamber, said second capsule piercing member arranged in the brewing chamber and said capsule adapter are designed so that when said brewing chamber is closed with said capsule adapter therein, said second capsule piercing member arranged in the brewing chamber is positioned in or in front of a port provided in the bottom wall of said capsule receptacle, preventing said second piercing member from damaging the capsule adapter.

22. System according to claim 21, wherein the second capsule piercing member arranged in the brewing chamber is positioned so that a beverage dispensed from said capsule adapter flows there through.

* * * * *